United States Patent
Hintea et al.

(10) Patent No.: US 10,696,137 B2
(45) Date of Patent: Jun. 30, 2020

(54) AUTOMATED CLIMATE CONTROL SYSTEM

(71) Applicant: JAGUAR LAND ROVER LIMITED, Coventry, Warwickshire (GB)

(72) Inventors: Diana Hintea, Coventry (GB); James Brusey, Bedworth (GB); Neil Beloe, Ashbourne (GB)

(73) Assignee: JAGUAR LAND ROVER LIMITED, Coventry, Warwickshi (GB)

( * ) Notice: Subject to any disclaimer, the term of this patent is extended or adjusted under 35 U.S.C. 154(b) by 240 days.

(21) Appl. No.: 15/572,699

(22) PCT Filed: Jun. 2, 2016

(86) PCT No.: PCT/EP2016/062472
§ 371 (c)(1),
(2) Date: Nov. 8, 2017

(87) PCT Pub. No.: WO2016/198307
PCT Pub. Date: Dec. 15, 2016

(65) Prior Publication Data
US 2018/0134118 A1    May 17, 2018

(30) Foreign Application Priority Data
Jun. 12, 2015 (GB) .................................. 1510291.6

(51) Int. Cl.
*B60H 1/00* (2006.01)

(52) U.S. Cl.
CPC ....... *B60H 1/00971* (2013.01); *B60H 1/0073* (2019.05); *B60H 1/00742* (2013.01); *B60H 2001/00733* (2019.05)

(58) Field of Classification Search
CPC combination set(s) only.
See application file for complete search history.

(56) References Cited

U.S. PATENT DOCUMENTS 4,893,480 A * 1/1990 Matsui ................. B60H 1/3205
                                                     62/225
5,755,378 A   5/1998 Gerhard et al.
(Continued)

FOREIGN PATENT DOCUMENTS

EP        022813 A2    7/1987

OTHER PUBLICATIONS

Combined Search and Examination Report for GB Application No. 1510291.6, dated Oct. 27, 2015, 6 pages.
(Continued)

*Primary Examiner* — Abby Y Lin
*Assistant Examiner* — Renee LaRose
(74) *Attorney, Agent, or Firm* — Miller Nash Graham & Dunn LLP

(57) ABSTRACT

A control unit for a climate control system for a vehicle, comprising; a monitoring module arranged to monitor at least one demand representative of an environmental parameter change within the vehicle and/or at least one active user input relating to an environmental parameter within the vehicle; a storage means storing a control policy for configuring at least one climate control element; a feedback module configured to receive the at least one demand from the monitoring module and to receive a simulated control policy from a simulation module; wherein the feedback module is configured to update the control policy, based on the simulated control policy, in response to receiving the at least one demand; and an implementation module for controlling said at least one climate control element in accordance with said control policy.

20 Claims, 4 Drawing Sheets

(56) References Cited

U.S. PATENT DOCUMENTS

| | | | |
|---|---|---|---|
| 2003/0146290 A1* | 8/2003 | Wang | B60H 1/00735 |
| | | | 236/49.3 |
| 2005/0077037 A1 | 4/2005 | Pham et al. | |
| 2011/0172880 A1 | 7/2011 | Tamura | |
| 2012/0067559 A1* | 3/2012 | Greiner | B60H 1/00964 |
| | | | 165/204 |

OTHER PUBLICATIONS

International Search Report and Written Opinion for PCT Application No. PCT/EP2016/062472, dated Aug. 22, 2016, 10 pages.

* cited by examiner

AUTOMATED CLIMATE CONTROL SYSTEM

CROSS-REFERENCE TO RELATED APPLICATIONS

This application is a 371 of International Application No. PCT/EP2016/062472, filed Jun. 2, 2016, which claims priority to GB Patent Application 1510291.6, filed Jun. 12, 2015, the contents of both of which are incorporated by reference herein in their entirety.

TECHNICAL FIELD

The present disclosure relates to an automated climate control system for a vehicle, particularly but not exclusively for a land vehicle. Aspects of the invention relate to a control unit, an automated climate control system, a vehicle, and a method of controlling a climate of a vehicle cabin.

BACKGROUND

Automated climate control systems for vehicle cabins are well known. Such systems include a user input for controlling the climate, a climate control element, such as an air blower, and a control policy.

The control policy is arranged to configure the air blower to output a flow rate and temperature of air according to the control policy, in order to comply with the user input. Various sensors can be included within an interior of the vehicle cabin for sensing climate changes affected by the operation of the air blower. These sensed changes are often fed back to the climate control system which may then re-configure the air blowers, according to the control policy, and in dependence on the sensed climate changes.

Auxiliary climate control features such as seat and steering wheel heaters can also be controlled in the same way. Such heaters are typically manually adjusted by the vehicle user, so that they are switched on for a desired period of time, according to the user's comfort requirements.

Alternative control systems may employ additional sensors for gathering information on physical parameters such as solar load, external air temperature and engine temperature. This information is also used to influence the control of the cabin environment.

This feedback generally occurs by transiently changing the low level control features of the actual air blower, according to the user feedback, whilst leaving the control policy data unchanged. These control features include voltage inputs to thermal elements of the blowers and fan/compressor motors. If there is an error in the control policy data, the user feedback adjustments will be constantly required during use of the climate control system.

Such a system places a large burden on the feedback functionality, and thus on the on board computer and sensors. This is particularly true with most existing systems since the control policy data is typically estimated, often using crude techniques. Accordingly, such errors in control policy data and the corresponding impact on user feedback functionality are common.

Against this background, it is an aim of the present invention to overcome or at least substantially alleviate the disadvantages known in the prior art.

SUMMARY OF INVENTION

Aspects and embodiments of the invention are set out in the accompanying claims.

According to an aspect of the invention there is provided a control unit for a climate control system of a vehicle. The control unit comprises a monitoring module arranged to monitor at least one demand representative of an environmental parameter change within the vehicle and/or at least one active user input relating to an environmental parameter within the vehicle. The control unit comprises storage means storing a control policy for configuring at least one climate control element. The control unit further comprises a feedback module configured to receive the at least one demand from the monitoring module and to receive a simulated control policy from a simulation module. The feedback module is configured to update the control policy, based on the simulated control policy, in response to receiving the at least one demand. The control unit comprises an implementation module for controlling said at least one climate control element in accordance with said control policy.

According to another aspect of the invention there is provided a control unit for a climate control system of a vehicle, comprising means for monitoring at least one demand representative of an environmental parameter change within the vehicle and/or at least one active user input relating to an environmental parameter within a vehicle, means for storing a control policy for configuring at least one climate control element, means for receiving the at least one demand from the monitoring module and to receive a simulated control policy from a simulation module; wherein the feedback module is configured to update the control policy, based on the simulated control policy, in response to receiving the at least one demand, and means for controlling said at least one climate control element in accordance with said control policy.

According to another aspect of the invention there is provided a climate control system for a vehicle. The control unit may comprise a monitoring module arranged to monitor at least one demand representative of an environmental parameter change within the vehicle and/or at least one active user input relating to an environmental parameter within the vehicle. The control unit may comprise a control policy for configuring at least one climate control element in response to the at least one demand. The control unit may comprise a feedback module configured to receive the at least one demand from the monitoring module and a simulated control policy from a simulation module. In an embodiment, the feedback module is configured to update the control policy, based on the simulated control policy, in response to receiving the at least one demand.

Simulating the control policy, prior to the feedback module updating the control policy, reduces the risk of the control policy containing erroneous data. This has a knock on effect of reducing the burden on the feedback module in use and reduces the length of time it takes for the feedback module to optimize the control policy. Additionally, by refining the initially simulated control policy during the real world operation of the vehicle, the control policy may be updated to suit alternative and/or unforeseen environmental conditions.

A further advantage of invention is that by simulating and then dynamically updating the control policy, the operation of the climate control system is optimised for a user's individual perception of relative comfort, without the need for the user to frequently input demands into the system. Therefore, much of the frequent user interaction, required in previous climate control systems, is not needed and the driver can afford more effort and concentration towards the task of driving the vehicle.

The active user input may comprise a request to change an environmental parameter selected from a list, including but not limited to, air temperature, air flow rate and steering-wheel temperature.

The environmental parameter change may relate to an environmental parameter selected from a list, including but not limited to, seat occupancy, seat temperature, humidity level, windshield clarity level, energy usage and air temperature.

The feedback module may be configured to receive the at least one demand from a plurality of environmental sensors.

Changing one environment parameter often impacts on another so by sensing a plurality of environmental parameter changes, the feedback module is able to take account of each of these effects when updating the control policy.

The system may include a plurality of environmental sensors each providing a temperature output representative of the temperature of different parts of the body; and, wherein the feedback module is configured to update the control policy in dependence on the temperature outputs.

Embodiments of the invention allow for a number of climate control systems to be accurately automated. By optimising the equivalent temperature perceived by the vehicle occupant, the system is able to provide greater comfort for a vehicle occupant (or occupants) given the varying conditions experienced in the vehicle, whilst maintaining optimal energy use and windscreen clarity. The phrase "equivalent temperature" is used to encompass the physiological equivalent temperature experienced by discrete areas of the body, and represents a universal index for the biometeorological perception of the thermal environment.

The feedback module may utilise a state-action-reward-state-action (SARSA($\lambda$)) algorithm, having a reward function, to change the control policy.

The phrase "change" is used to encompass modification by simulation and modification by updating, wherein the updating and simulating are achieved through machine learning.

The reward function allows for a high level specification of the arbitration between competing component requirements, such as the need to keep all passengers comfortable. Therefore, the SARSA($\lambda$) algorithm allows for the optimisation of the operation of a plurality of actuators.

The control policy may comprise a changeable rulebook and a fixed protocol.

Updating the rulebook and maintaining a fixed protocol ensures that the update feedback, during use, is maintained for successive users. As a result of this, a repetitive updating of the control policy is not needed as would otherwise be the case if the protocol also had to be modified.

The changeable rulebook may be arranged to determine a set point value for configuring the climate control element based on the demand.

The fixed protocol may be arranged to determine a control parameter for configuring the climate control element based on the set point value.

The climate control element may be at least one of: a windshield heating element, a steering wheel heating element, an A/C unit, a fan motor and an air heating element.

The system may include a simulation module, i.e. the simulation module from which the simulated control policy is received by the feedback module. The simulation module may be configured to simulate the control policy by one-dimensional simulation. The simulation module may utilise a state-action-reward-state-action (SARSA($\lambda$)) algorithm, having a reward function, to change the control policy.

The one-dimensional simulation simulates a small set of environmental state variables as opposed to a three-dimensional simulation, which typically divides a simulated environment into a much larger number of equally sized cells. By comparison, one-dimensional simulation is therefore less accurate but computationally more efficient than three-dimensional simulation. However, the one-dimensional simulation provides a sufficient level of accuracy with which to determine the control policy.

According to a further aspect of the invention there is provided a vehicle comprising a climate control system according to the previous embodiment of the invention.

According to yet another aspect of the invention there is provided a method of controlling a climate of a vehicle cabin. The method comprises monitoring at least one demand representative of an environmental parameter change within the vehicle and/or at least one active user input relating to an environmental parameter within the vehicle. The method further comprises configuring, by means of a control policy, at least one climate control element. The method comprises receiving the at least one demand from the monitoring module and a simulated control policy from a simulation module. The method comprises updating the control policy, based on the simulated control policy, in response to receiving the at least one demand. The method comprises controlling said at least one climate control element in accordance with said control policy.

According to yet another aspect of the invention there is provided a method comprising; monitoring at least one demand representative of an environmental parameter change within the vehicle and/or at least one active user input relating to an environmental parameter within the vehicle. The method may comprise configuring, by means of a control policy, at least one climate control element in response to the at least one demand. The method may comprise receiving the at least one demand from the monitoring module and a simulated control policy from a simulation module. The method may comprise updating the control policy, based on the simulated control policy, in response to receiving the at least one demand.

The active user input may comprise a request to change an environmental parameter selected from a list, including but not limited to, air temperature, air flow rate and steering-wheel temperature.

The environmental parameter change may relate to an environmental parameter selected from a list, including but not limited to, seat occupancy, seat temperature, humidity level, windshield clarity, energy usage and air temperature.

The at least one demand may be received from a plurality of environmental sensors.

The method may comprise providing a temperature output, by means of a plurality of sensors, representative of the temperature of different parts of the body; and, configuring the control policy, using the feedback module, to update the control policy in dependence on the temperature outputs The method may comprise changing the control policy, by means of a feedback module, using a state-action-reward-state-action (SARSA($\lambda$)) algorithm having a reward function.

The control policy may comprise a changeable rulebook and a fixed protocol.

The method may comprise determining a set point value for configuring the climate control element, in dependence on the demand, using the changeable rulebook, and updating the rulebook using the feedback module.

The method may comprise configuring the climate control element, based on the set point value, using the fixed protocol.

The control policy may be simulated by one-dimensional simulation.

The method may comprise changing the control policy, by means of a simulation module, using a state-action-reward-state-action (SARSA($\lambda$)) algorithm having a reward function.

The control policy and each of the feedback, monitor and simulation modules are provided as electronic data stored on a non-volatile memory component of a computer or logic system embedded within a control unit.

As used herein, the term "control unit" will be understood to include both a single control unit or controller and a plurality of control units or controllers collectively operating to provide the required control functionality. A set of instructions could be provided which, when executed, cause said controller(s) or control unit(s) to implement the control techniques described herein (including the method(s) described below). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

It will be appreciated that the foregoing represents only some of the possibilities with respect to the particular subsystems of a vehicle that may be included, as well as the arrangement of those subsystems with the control unit. Accordingly, it will be further appreciated that embodiments of a vehicle including other or additional subsystems and subsystem arrangements remain within the spirit and scope of the present invention.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION OF EMBODIMENTS

Figure 1:
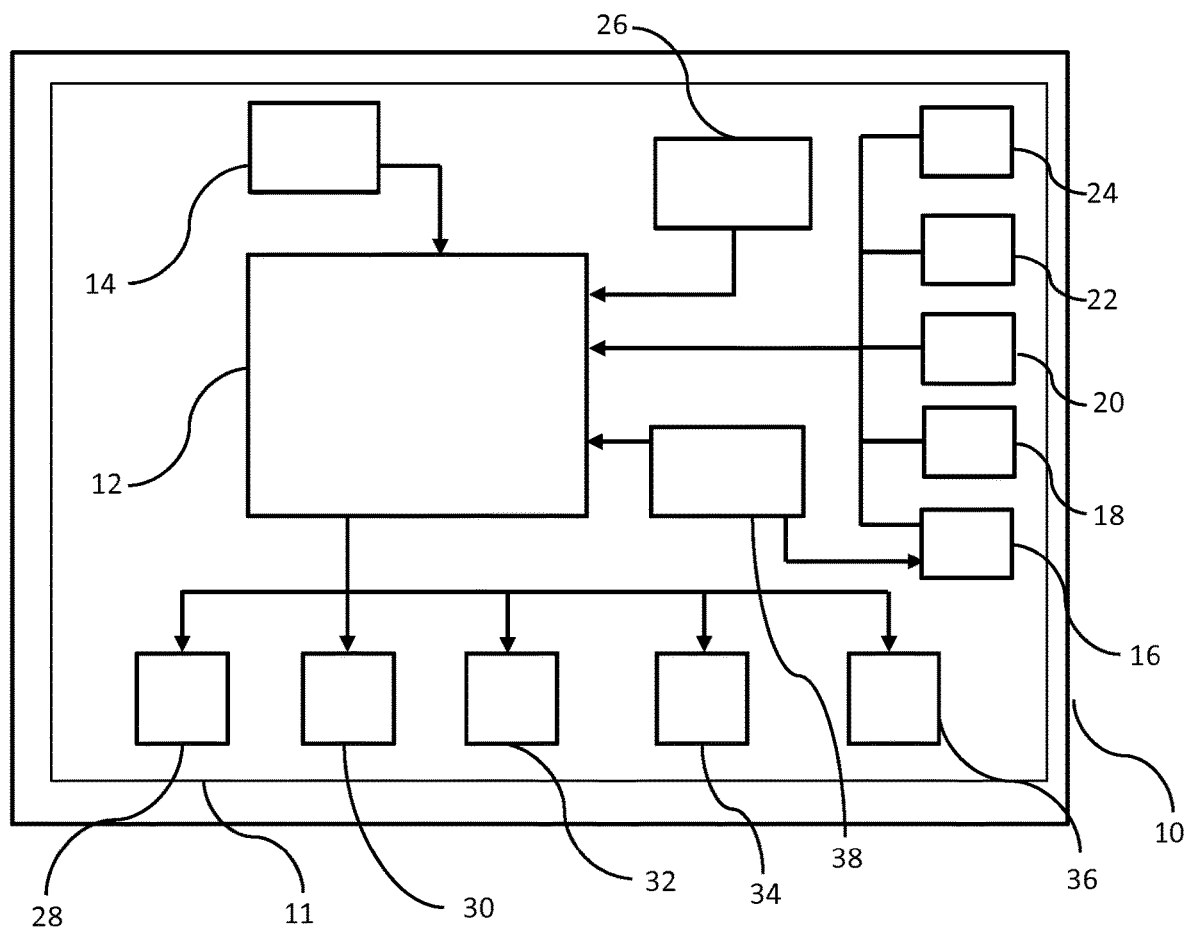
FIG. 1 is a schematic drawing of a vehicle provided with a climate control system according to an embodiment of the invention.

FIG. 1 illustrates a vehicle 10 including an automated climate control system. The climate control system includes a control unit 12, which is electronically connected to a plurality of input devices, including a human-machine interface (HMI) device 14 and a seat pressure sensor 26. The control unit 12 is also connected to a plurality of environmental parameter sensors, including an energy usage sensor 16, a seat temperature sensor 18, a humidity sensor 22, a windshield clarity sensor 20 and an air temperature sensor 24. The control unit 12 is also electronically connected to a plurality of actuators, including a windshield heating element 28, a steering wheel heating element 36, an A/C unit 34, a fan motor 30 and an air heating element 32.

A battery 38 is electrically connected to the control unit 12, and is arranged to provide power to the control unit 12 and all the accompanying inputs and actuators.

The HMI device 14 includes a rotatable dial, which is configured to receive an active input from the user, such as a desired cabin temperature set point value. Alternative configurations for the HMI device 14 include a touch screen device or a push button device. Alternatively or additionally, the HMI device 14 may include a specified remote unit and a receiver for receiving a signal from the specified remote unit. The specified remote unit may take the form of a key fob arranged to be carried by a user and to communicate with the receiver via a one-way or two-way wireless communication signal. Each user of a vehicle may have their own individual key fob on which they can program and store personal climate and comfort preferences, such that these may be implemented on detection of the key fob. If the user wishes to implement settings different to those stored in the key fob memory, for example if the user accidentally takes a key fob belonging to another user, the settings may simply be input to the HMI device 14 manually.

The seat pressure sensor 26 is a sensor for measuring the application of force such as is known in the art. The seat pressure sensor is configured to determine the number of occupants there are in the vehicle 10, according to the force applied to the base of each seat.

In the present embodiment, the energy usage sensor 16 is a battery state-of-charge sensor, which is electronically connected to the battery 38 and arranged so as to monitor the amount of electrical energy that remains in the vehicle battery 38.

The seat temperature sensor 18 is a thermometer, which is located within a seat of the vehicle and is configured to monitor the temperature of an outer surface of the seat, which is in direct contact with the seat occupant.

The humidity sensor 22 is a hygrometer. The hygrometer measures moisture content of the cabin air indirectly by monitoring the temperature of the dew point.

The windshield clarity sensor 20 is an optical moisture sensor that measures the presence of water droplets on the outer surface of the windshield by monitoring the light from a light source that is scattered by the droplets on the outer windshield surface.

The air temperature sensor 24 is a thermometer, which is located inside the vehicle cabin and is configured to monitor the temperature of the cabin air.

Each actuator of the climate control system 12 is a climate control element, capable of affecting an environmental characteristic of the vehicle cabin.

The windshield heating element 28 is a resistance heating element comprising a length of conducting material. The heating element is arranged as parallel lines of folded metal wire, and is embedded into the windshield and configured to heat the windshield when a current is passed through the element.

The fan motor 30 actuator is an electrical DC motor, configured to control the circulation of air around the vehicle cabin, by varying the speed at which a ventilation fan rotates.

The air heating element 32 is a resistance heating element, which is positioned in line with the ventilation fan and is arranged in the form of a coil of wire. The element is configured to heat the air blown into the cabin by the ventilation fan, when a current is passed through the heating element. Alternatively the heating element may be a positive thermal-coefficient (PTC) heater with a self-limiting characteristic.

The steering wheel heating element 36 is a resistance heating element, which is embedded in the body of the steering wheel and is configured to heat the body of the steering wheel, so as to warm the hands of the driver, when a current is passed through the element.

Figure 2:
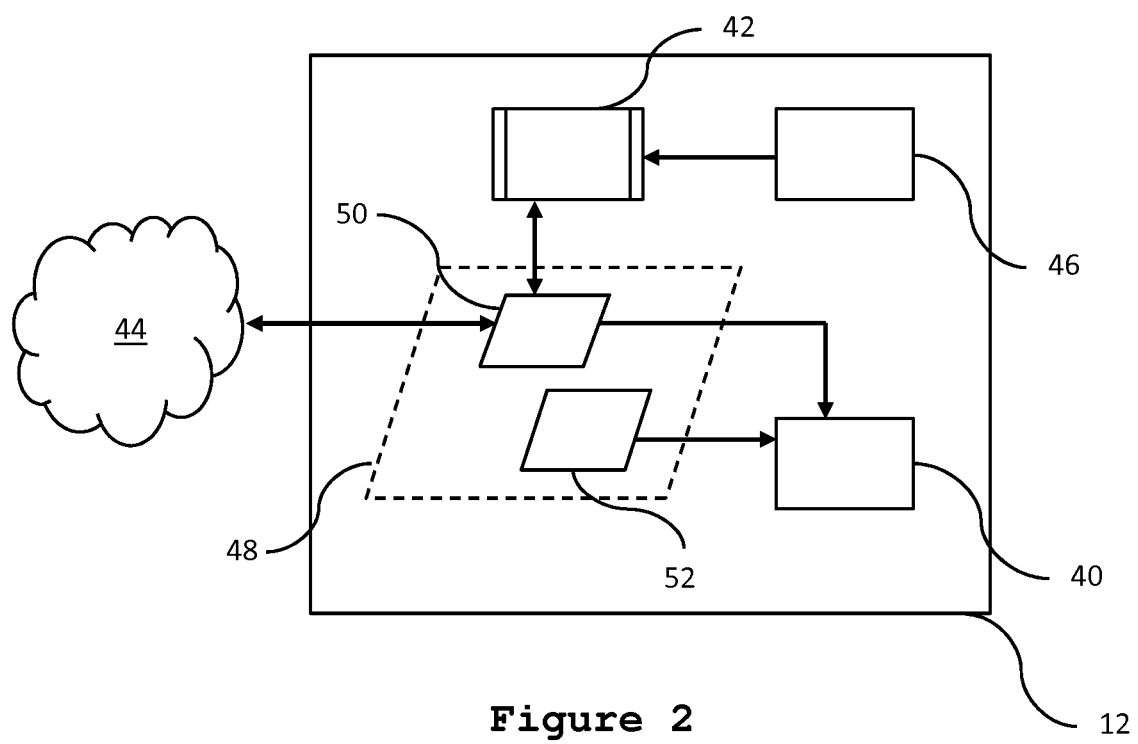
FIG. 2 is a schematic drawing of a control unit of the climate control system from FIG. 1.

FIG. 2 illustrates the control unit 12 of the climate control system, which includes a simulation module 44, a feedback module 42, a monitor module 46 and an implementation module 40. Also included in the control unit 12 is a control policy, which includes a rulebook 50 and a protocol 52. The rulebook 50 is a parameter vector, comprising an ordered, fixed length list of floating point numbers. The rulebook 50 is arranged so that the simulation module 44, the feedback module 42 and the implementation module 40 can each read the rulebook 50. The simulation 44 and feedback 42 modules can also change the rulebook 50. The protocol 52 is fixed and so cannot be changed by any of the modules. The protocol 52 is arranged so that it can be read by the implementation module 40.

The control policy 48 and each of the feedback 42, simulation 44, monitor 46 and implementation 40 modules are provided as electronic data stored on a non-volatile memory component of a computer or logic system embedded within the control unit 12.

The simulation module 44 is embodied in a separate peripheral device on a server system providing cloud data and processing functions, or may be embodied on a mobile device. The simulation module 44 uses a simulation algorithm to simulate an initial rulebook, which determines the set points at which each actuator should be set to, in order to achieve a desired environmental parameter. This process is carried out as an initial step, before the vehicle 10 is dispatched from the factory.

The implementation module 40 is a hardware controller, which reads the control policy 48 and uses it to direct each actuator to regulate the cabin environment, according to the teaching of the control policy 48.

When in use the monitor module 46 monitors the plurality of environmental parameter sensors to detect any environmental parameter changes within the vehicle cabin. The environmental parameter sensors are configured to detect changes in environmental parameters of the vehicle cabin relating to, for example, seat occupancy, seat temperature, humidity, windshield clarity, battery energy and air temperature.

Changes in the seat occupancy within the vehicle cabin are detected by receiving a passive user input to provide an indication of the occupancy of the vehicle seats.

Changes in seat temperature level, humidity level, windshield clarity level, battery energy usage and air temperature level are detected by means of receiving an environmental sensor input from an appropriate sensor.

The monitor module 46 also monitors the HMI device in order to receive active user inputs from the occupants of the vehicle (i.e. inputs relating to environmental parameters in the vehicle cabin which a user selects or demands).

The environmental sensor input data, the passive user input data and the active user input data are transferred to the feedback module 42 after being conditioned by a conditioning circuit within the monitor module 46.

The feedback module 42 interprets data received form the monitor module 46 and uses it to dynamically calibrate the rulebook according to the passive user inputs, the active user inputs and the sensed environmental parameters, A mode of operation of the climate control system is described in more detail hereafter.

Figure 3:
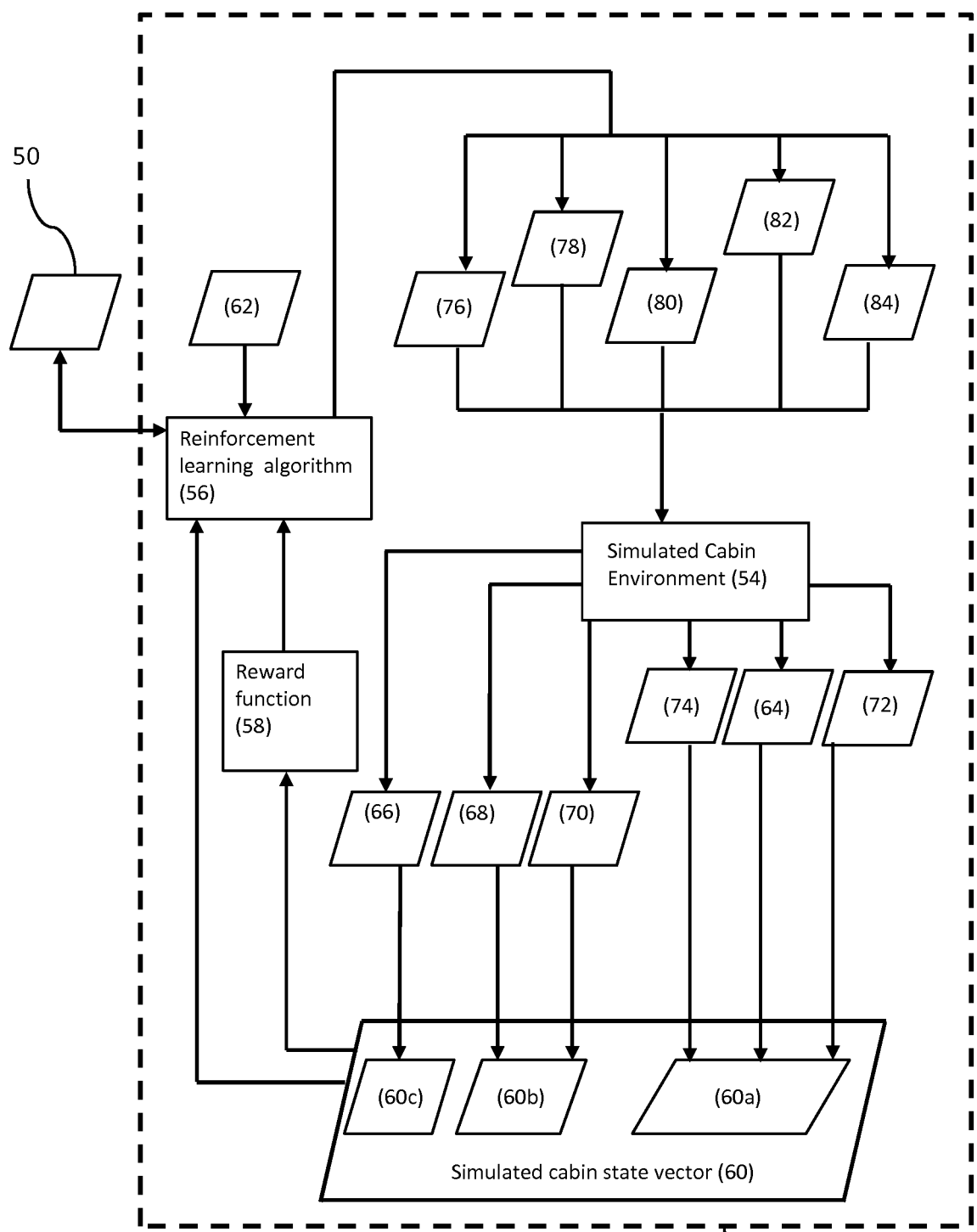
FIG. 3 is a block diagram illustrating steps associated with a simulation module of the climate control system from FIG. 1; and, FIG. 4 is a block diagram illustrating the steps associated with a feedback module of the climate control system from FIG. 1.

FIG. 3 illustrates steps associated with the simulation algorithm, executed by the simulation module 44.

In use, a simulated demand is imposed on the climate control system by the simulation module 44. This may take the form of a simulated active user input 62, for example, which sets the internal air temperature to 20 degrees Celsius. The simulation algorithm uses one-dimensional simulation to simulate the effect of the actuators on a simulated cabin environment 54, in order to determine the best possible means of achieving an internal air temperature of 20 degrees Celsius.

The processing cycle begins with a reinforcement learning algorithm 56 receiving a simulated cabin state vector 60, which includes a thermal comfort component 60a, a power consumption component 60c and a screen clarity component 60b.

The thermal comfort component 60a includes a set of equivalent temperature (ET) values, representing the equivalent temperature experienced by discrete areas of the body of each occupant within the cabin. The discrete body areas may include the head, trunk, hands and feet. The ET values are derived from the simulated seat temperature 64, air temperature 72 and seat pressure value 74.

The power consumption component 60c comprises a value indicative of the electrical power used during the last period of operation for simulated climate control system, and is derived from the simulated energy usage value 68.

The screen clarity component 60b includes a value indicative of the clarity of the windscreen and is derived from the simulated windshield clarity 70 and humidity values 66.

The reinforcement learning algorithm 56 analyses the initial simulated vehicle state in conjunction with the simulated active user input 62 and decides on an action to take. The subsequent action takes the form of a set of simulated actuator set point values 76, 78, 80, 82 and 84, which are fed into the simulated cabin environment 54.

The simulated actuator set point values include a simulated windshield heating element set point value 76, a simulated fan motor set point value 78, a simulated air heating element set point value 80, a simulated A/C unit set point value 82 and a simulated steering wheel heating element set point value 84.

In one embodiment, the set point values are assigned from a 5 point scale ranging from 0 to +4, representing the relative operating condition of each actuator, whereby +4 represents the maximum operating condition and 0 represents the minimum operating condition. The actuator control parameters correspond to the specific architecture and function of each actuator. For example, if the steering wheel set point value is set to +4, according to the rulebook, this would result in the implementation module 40 directing the maximum current through the heating element, so that the maximum intensity of thermal heat would be emitted through the body of the steering wheel. The amount of current passing through the heating element is determined by the protocol 52 and is fixed for a given set point value.

The results of the simulation are translated into a set of simulated environmental states, which represent the newly simulated environmental sensor values. The simulated environmental states are then combined to produce a simulated cabin state vector 60.

The reinforcement learning algorithm 56 requires a well-defined environmental state space representation, which is provided by the simulated cabin state vector 60. The reward function 58 analyses the simulated cabin state vector 60 in order to determine a scalar reward for the action taken, which is based on a weighted sum of the vector elements. The scalar reward is then used by the reinforcement learning algorithm 56 to determine the effectiveness of the action taken, in achieving the simulated active user input 62. The results of this analysis are used to provide the initial rulebook.

The initial rulebook is fed back to the reinforcement learning algorithm 56, where it is analysed in conjunction with the cabin state vector and the simulated active user input 62 in order to determine the next action to be taken. The processing cycle repeats, and for each subsequent iteration, the reinforcement learning algorithm 56 adjusts the rulebook accordingly.

The data in the simulated rulebook is derived from the relationship between the plurality of simulated environmental and user state parameters, and the plurality of simulated actuator set point values.

The simulation module 44 therefore simulates the rulebook, so that the optimum selection of actuator set point values is simulated for a given demand.

After a number of processing cycles the simulation algorithm will converge on a rulebook 50, which achieves the demand set by the simulated active user input 62, as determined by the judgement of the reward function 58.

Reinforcement learning algorithms take time to converge on a solution, especially where a large number of parameters are to be considered. Therefore by using a simulated cabin environment 54 to derive an initial rulebook, the climate control system will be operational in a partially optimised state before the user enters the vehicle 10. The need for the climate control unit 12 to undertake an extended learning phase is therefore eliminated.

Figure 4:
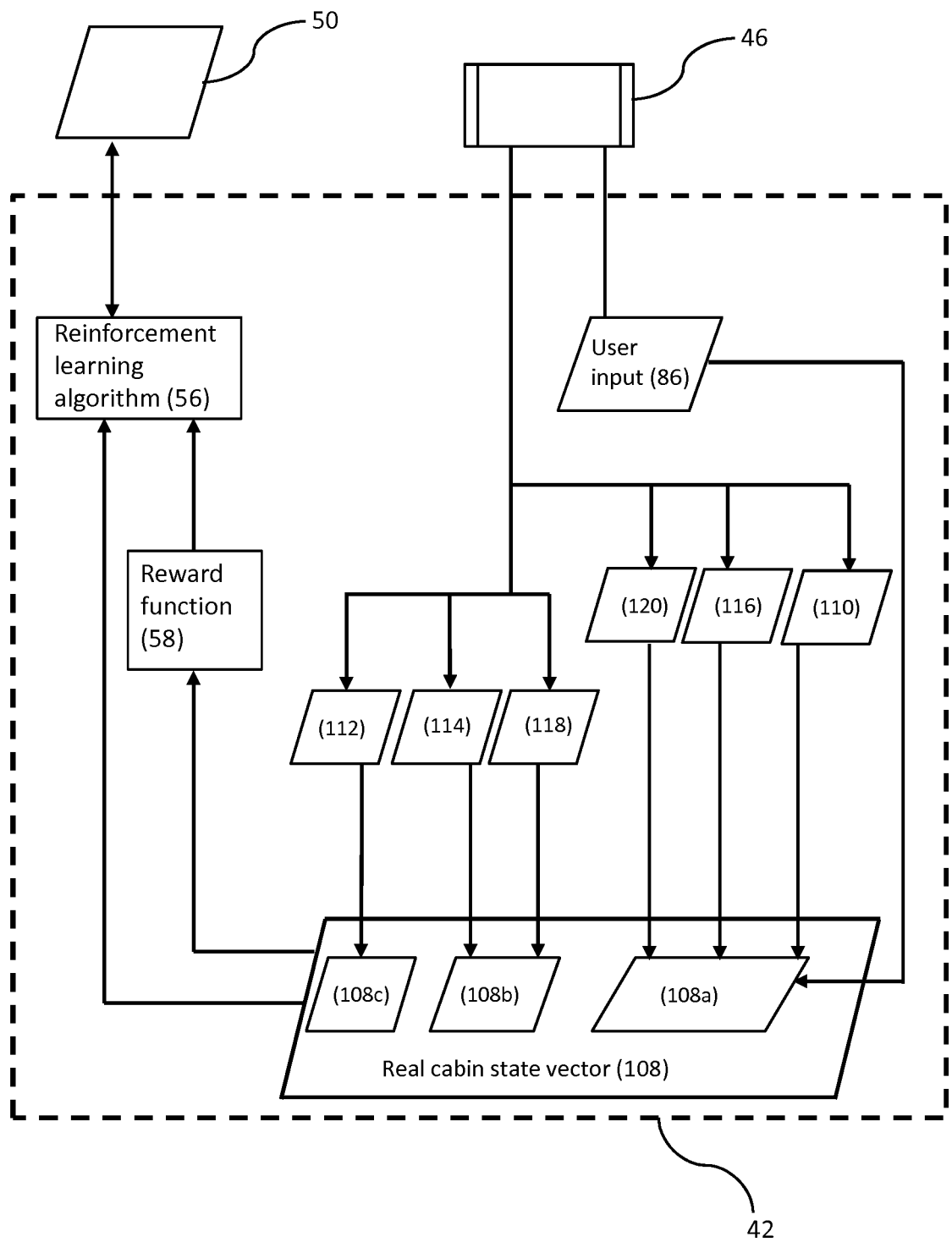

FIG. 4 illustrates the steps associated with a feedback algorithm, executed by the feedback module 42. The feedback module 42 interacts with the monitor module 46 to receive data from the environmental and passive user sensors, in order to determine the current state of the cabin. The feedback module 42 also interacts with the monitor module 46 to receive an active user input 86 from the HMI device 14.

Upon receiving the conditioned environmental sensor data, together with the passive and active user input data, the feedback module 42 combines the conditioned sensor data together to produce a real cabin state vector 108 of numerical (or Boolean) values. The state vector 108 is then provided to the reinforcement learning algorithm 56 and the reward function 58 at regular and periodic intervals to be analysed.

The thermal comfort component 108*a* includes a set of equivalent temperature (ET) values, representing the physiological equivalent temperature experienced by discrete areas of an occupant's body, within the cabin. The equivalent temperature values are derived from sensor data values, which are received from temperature sensors arranged in appropriate locations around the cabin. The pressure sensor value 120 identifies which seats are occupied within the cabin and therefore which temperature sensor values are more relevant for determining the level of user comfort.

The power consumption component 108*c* comprises a value indicative of the electrical power used during the last period of operation for the real climate control system, and is derived from the simulated energy usage value 112.

The screen clarity component 108*b* includes a value indicative of the clarity of the windscreen and is derived from the windshield clarity 118 and humidity sensor values 114.

The reinforcement learning algorithm 56, of the feedback module 42, analyses the rulebook that has been simulated by the simulation module 44 and executed by the implementation module 40. As with the simulated cabin environment, the reward function 58 provides feedback to the reinforcement learning algorithm 56 in the form of a scalar reward. The reinforcement learning algorithm 56 uses the scalar reward in conjunction with the real cabin state vector 108 and the active user input value 86 to update the rulebook 50.

In this way, every course of action taken by the implementation module 40 is analysed by the feedback module 42, with respect to the comfort of the vehicle occupants, the clarity of the windshield and the energy efficiency of the system.

By continuously updating the rulebook 50, the feedback algorithm is able to calibrate the rulebook 50 according to real environmental sensor data. The feedback algorithm is also capable of updating the rulebook 50 to suit the comfort preferences of a particular user or users, for a given set of environmental parameters.

During operation of the climate system, by a vehicle occupant, the implementation module 40 addresses the rulebook 50 and reads the simulated actuator set point values, which include a windshield heating element set point value, a fan motor set point value, an air heating element set point value, an A/C unit set point value and a steering wheel heating element set point value.

A control parameter, corresponding to each actuator set point value, is then read from the protocol 52 and addressed directly to each actuator by the implementation module 40, in order to achieve the demand of the vehicle occupant.

The actuator control parameter values include a windshield heating element control parameter value, a fan motor control parameter value, an air heating element control parameter value, a A/C unit control parameter value and a steering wheel heating element control parameter value.

The implementation module 40 addresses the control policy 48 at regular and periodic intervals, and reacts to any adjustment to the control policy 48 by addressing the climate control elements according to the updated rulebook.

During initial operation of the climate control system 12, the implementation module 40 directs each of the climate control elements according to the teaching of the simulated rulebook. Following the first iteration of the feedback algorithm, the implementation module 40 operates under the instruction of the updated rulebook. By operating in this way, the climate control system is able to optimise the operation of the climate system to improve the comfort of the vehicle occupants.

The computational approach, undertaken by both the simulation 44 and feedback 42 modules, is carried out using a state-action-reward-state-action eligibility trace (SARSA ($\lambda$)) algorithm. SARSA($\lambda$) is a temporal difference learning method, in that it changes an earlier rulebook estimate, based on how it differs from a later rulebook estimate. SARSA($\lambda$) differs from a state-action-reward-state-action (SARSA) algorithm due to the fact that it considers more than one previous rulebook estimate in its calculation.

The sensed environmental parameters, determined from the plurality of the sensed inputs, are equivalent to the simulated environmental state variables, thereby enabling both the simulation and feedback modules to change the rulebook.

If the feedback module were to directly control each of the climate control elements, through manipulation of the protocol, it may cause harm to the climate control elements and/or harm being caused to the vehicle occupants. By separating the operation of the climate system into a high-level rulebook and a low-level protocol the reinforcement learning algorithm can explore the effects of all possible set point value combination, whilst reducing the risk of damage being caused to the climate control elements and/or harm being caused to the vehicle occupants. Hence, an allowance for an incorrect action is accommodated within the operation of the climate control system.

Furthermore, the ordinary operating cycle time for a climate control element may typically be a few milliseconds (or less), whereas the cycle time for updating the policy need only be one or two seconds. To accommodate for this disparity, the climate system is able to convert high-level actuation control, according to the rulebook, into low-level climate control element control, as determined by the protocol Alternative physical parameters can be measured by the simulation 44 and feedback 42 modules of the climate control system, and therefore applied to the rulebook.

In one embodiment, parts of the automated climate control system (particularly those comprised within the simulation module 44) are embodied in peripheral devices, on a server system or systems providing cloud data and processing, or on a mobile device. In other embodiments, the simulation module may be wholly contained, along with the feedback 42, monitor 46 and implementation 40 modules of the control unit 12, within the vehicle 10.

In another embodiment, the sensors and actuators are positioned inside the cabin of the vehicle 10 in order to effectively monitor and affect the environmental parameters within the cabin. In another embodiment, a number of alternative sensors and actuators could be used to monitor and affect the environmental conditions both inside and outside of the vehicle cabin.

In another embodiment, the rulebook can be pre-set according to individual user's preferences, in which a pre-determined set of control parameters are engaged upon reaching a given physical parameter threshold value. The application of the individual user's rulebook preferences could be applied upon sensing of the user's presence within the vehicle 10. The identification of the user could be achieved by sensing the proximity of an ignition key that is registered to the user. Alternatively, a video camera could be installed in the vehicle 10, so as to record the facial features and expressions of the vehicle occupants. These recorded features could then be used in the identification of individual passengers within the vehicle 10.

In another embodiment, the rulebook can be pre-set according to different climatic and/or temporal situations. For example, a different rulebook can be used in dependence on the time of day or year.

In another embodiment, the control policy may contain multiple rulebooks with each rulebook being associated with a particular operation mode of the climate system. Each rulebook could utilise a different reward function to influence the determination of set point values, which could preferentially achieve their pre-defined objective. For example, a comfort mode may prioritise determining whichever combination of set point values was best suited to optimising the thermal comfort of the vehicle occupant; an economy mode may prioritise reducing the power consumption of the system; and, a screen clarity mode would favour increasing the clarity of the vehicle windscreen.

The monitor module may further include a dial, or other selection means, which may be used by the vehicle occupant to select different rulebooks, and thereby switch between the different operating modes. Alternatively, the user may override the operation of the climate control system, thereby allowing the user to manually select individual climate control element set point values.

In another embodiment, a microphone is located in the vehicle cabin that can be configured to monitor the level of noise in the cabin, in order to prevent the noise level disrupting passenger comfort.

In another embodiment, a $CO_2$ sensor is located in the vehicle cabin, configured to monitor the level of $CO_2$ in the cabin environment, in order to prevent the level of $CO_2$ exceeding a pre-defined limit which may cause harm to the vehicle occupant.

In another embodiment, the automated climate control system further includes an air direction actuator or door, configured to direct air to different areas of the cabin. The air direction actuator is driven by an electric servo motor so that the position of the actuator is continuously variable.

In another embodiment, the automated climate control system includes a seat heating and/or cooling element, positioned within a seat of the vehicle, and configured to heat the outer surface of the seat, so as to warm the seat occupant.

It will be appreciated by someone skilled in the art that the invention could be modified to take many other alternative forms without departing from the scope of the claims.

The invention claimed is:

1. A control unit for a climate control system of a vehicle, the control unit comprising:
    a monitoring module arranged to monitor at least one demand representative of an environmental parameter change within the vehicle and/or at least one active user input relating to an environmental parameter within a vehicle;
    storage means for storing a control policy for configuring at least one climate control element;
    a feedback module configured to receive the at least one demand from the monitoring module and to receive a simulated control policy from a simulation module; wherein the feedback module is configured to update the control policy, based on the simulated control policy, in response to receiving the at least one demand; and, an implementation module for controlling said at least one climate control element in accordance with said control policy, wherein either or both of the feedback module and the simulation module utilises a state-action-reward-state-action (SARSA($\lambda$)) algorithm, having a reward function, to change the control policy.

2. A control unit according to claim 1, wherein the feedback module is configured to receive the at least one demand from a plurality of environmental sensors.

3. A control unit according to claim 1, wherein the climate control system includes the simulation module.

4. A control unit according to claim 1, wherein the simulation module is configured to simulate the control policy by one-dimensional simulation.

5. A control unit for a climate control system of a vehicle, the control unit comprising:
a monitoring module arranged to monitor at least one demand representative of an environmental parameter change within the vehicle and/or at least one active user input relating to an environmental parameter within a vehicle;
storage means for storing a control policy for configuring at least one climate control element;
a feedback module configured to receive the at least one demand from the monitoring module and to receive a simulated control policy from a simulation module; wherein the feedback module is configured to update the control policy, based on the simulated control policy, in response to receiving the at least one demand; and,
an implementation module for controlling said at least one climate control element in accordance with said control policy, wherein the control policy comprises a changeable rulebook and a fixed protocol.

6. A control unit according to claim 5, wherein the changeable rulebook is arranged to determine a set point value for configuring the climate control element based on the demand.

7. A control unit according to claim 6, wherein the fixed protocol is arranged to determine a control parameter for configuring the climate control element based on the set point value.

8. A control unit according to claim 5, wherein the feedback module is configured to receive the at least one demand from a plurality of environmental sensors.

9. A control unit according to claim 5, wherein the climate control system includes the simulation module.

10. A control unit according to claim 5, wherein the simulation module is configured to simulate the control policy by one-dimensional simulation.

11. A climate control system for a vehicle comprising a control unit according to claim 1.

12. A climate control system according to claim 11, wherein the feedback module of the control unit is configured to receive the at least one demand from a plurality of environmental sensors, wherein the plurality of environmental sensors includes sensors each providing a temperature output representative of the temperature of different parts of the body of a vehicle occupant; and, wherein the feedback module is configured to update the control policy in dependence on the temperature outputs.

13. A vehicle comprising a climate control system according to claim 11.

14. A method of controlling a climate of a vehicle cabin, the method comprising:
monitoring at least one demand representative of an environmental parameter change within the vehicle and/or at least one active user input relating to an environmental parameter within the vehicle;
configuring, by means of a control policy, at least one climate control element;
receiving the at least one demand from the monitoring module and a simulated control policy from a simulation module;
updating the control policy, based on the simulated control policy, in response to receiving the at least one demand;
controlling said at least one climate control element in accordance with said control policy; and
changing the control policy using a state-action-reward-state-action (SARSA(k)) algorithm having a reward function.

15. The method according to claim 14, wherein the at least one demand is received from a plurality of environmental sensors.

16. The method according to claim 15, wherein the method comprises providing a temperature output, by means of a plurality of sensors, representative of the temperature of different parts of the body; and updating the control policy in dependence on the temperature outputs.

17. The method according to claim 14, wherein the control policy comprises a changeable rulebook and a fixed protocol.

18. The method according to claim 17, wherein the method comprises determining a set point value for configuring the climate control element, in dependence on the demand, using the changeable rulebook, and updating the rulebook.

19. The method according claim 18, wherein the method comprises configuring the climate control element, based on the set point value, using the fixed protocol.

20. The method according to claim 14, wherein the control policy is simulated by one-dimensional simulation.

* * * * *